US008236116B2

(12) United States Patent
Sol et al.

(10) Patent No.: US 8,236,116 B2
(45) Date of Patent: Aug. 7, 2012

(54) METHOD OF MAKING COATED GLASS ARTICLE, AND INTERMEDIATE PRODUCT USED IN SAME

(75) Inventors: Jean-Marc Sol, Thionville (FR); Herbert Lage, Luxembourg (LU); John A. Vanderploeg, Highland, MI (US); Desaraju V. Varaprasad, Ann Arbor, MI (US); Lutz Henkel, Strassen (LU); Marcel Schloremberg, Habay-la-Neuve (BE)

(73) Assignees: Centre Luxembourgeois de Recherches pour le Verre et al Ceramique S.A. (C.R.V.C.), Luxembourg (LU); Guardian Industries Corp., Auburn Hills, MI (US)

( * ) Notice: Subject to any disclaimer, the term of this patent is extended or adjusted under 35 U.S.C. 154(b) by 850 days.

(21) Appl. No.: 11/808,133

(22) Filed: Jun. 6, 2007

(65) Prior Publication Data
US 2008/0302462 A1 Dec. 11, 2008

(51) Int. Cl.
*B32B 17/00* (2006.01)
(52) U.S. Cl. .......... 156/99; 156/104; 156/107; 156/108; 156/109; 156/714; 156/918; 427/154
(58) Field of Classification Search ............ 156/99, 156/104, 107–109, 304.1, 157, 502, 544, 156/714, 750, 918; 428/57, 61; 427/154
See application file for complete search history.

(56) References Cited

U.S. PATENT DOCUMENTS

| | | | |
|---|---|---|---|
| 4,379,114 A * | 4/1983 | Fujiki et al. | 264/248 |
| 4,710,426 A | 12/1987 | Stephens | |
| 5,770,321 A | 6/1998 | Hartig et al. | |
| 5,800,933 A | 9/1998 | Hartig et al. | |
| 6,461,731 B1 | 10/2002 | Veerasamy et al. | |
| 6,524,714 B1 | 2/2003 | Neuman et al. | |
| 6,541,084 B2 | 4/2003 | Wang | |

(Continued)

FOREIGN PATENT DOCUMENTS

DE 197 45 183 4/1999

(Continued)

OTHER PUBLICATIONS

International Search Report dated Aug. 8, 2008.

(Continued)

*Primary Examiner* — Christopher Schatz
(74) *Attorney, Agent, or Firm* — Nixon & Vanderhye P.C.

(57) ABSTRACT

In certain example embodiments of this invention, there is provided a method of making a window, the method including: forming a multi-layered low-E and/or solar control coating on a glass substrate; providing at least two flexible protective sheets in non-liquid form to the glass substrate over at least part of the low-E and/or solar control coating; applying at least one protective coating in liquid form, before and/or after the flexible protective sheets are provided, so as to reduce one or more gaps formed between the low-E and/or solar control coating and the flexible protective sheet(s) and/or between the flexible protective sheets; and performing one or more of cutting, edge seaming, and/or washing the coated article with the protective coating and protective sheets thereon and peeling the protective sheets and at least part of the protective coating off of the top surface of the low-E and/or solar control coating. Heat treatment (e.g., thermal tempering) may then be performed, and the heat treated coated article may be used in a window unit or the like.

19 Claims, 12 Drawing Sheets

U.S. PATENT DOCUMENTS

| | | | |
|---|---|---|---|
| 6,682,773 B2 | 1/2004 | Medwick et al. | |
| 6,964,989 B1 * | 11/2005 | Fang et al. | 524/145 |
| 2003/0150711 A1 | 8/2003 | Laird | |
| 2005/0210921 A1 | 9/2005 | Richardson et al. | |
| 2006/0065350 A1 | 3/2006 | Richardson et al. | |

FOREIGN PATENT DOCUMENTS

| | | |
|---|---|---|
| EP | 1 371 702 | 12/2003 |
| FR | 2 272 961 | 12/1975 |
| GB | 2 145 640 | 4/1985 |
| WO | WO 90/08165 | 7/1990 |
| WO | WO 2005/100276 | 10/2005 |
| WO | WO 2006044369 A1 * | 4/2006 |

OTHER PUBLICATIONS

SpeedMask "UV Curable Temporary Masking Resins", Resins and Light Curing Systems, Dymax Corp., Selector Guide (4pgs).

General Chemical Corporation Material Safety Data Sheet (2pgs).

* cited by examiner

METHOD OF MAKING COATED GLASS ARTICLE, AND INTERMEDIATE PRODUCT USED IN SAME

FIELD OF THE INVENTION

This invention in certain example instances relates to a method of making and/or transporting a coated glass article. In certain example instances, one or more temporary protective polymer based layers is/are formed on a coated glass substrate to protect the low-E and/or solar control coating thereof during transport, cutting, edge seaming, washing and handling prior to heat treatment (e.g., thermal tempering). To reduce gaps and/or capillaries that may form proximate to the glass substrate, a liquid coating may be applied above, between, and/or below the protective layer(s) on the glass substrate and/or on, between, or under the protective layer(s). Typically, the temporary protective layer(s) may be removed by peeling prior to heat treatment.

BACKGROUND AND SUMMARY OF EXAMPLE EMBODIMENTS OF THE INVENTION

It is known in the art to use coated articles in the context of window units such as insulating glass (IG) window units. For example, see U.S. Pat. No. 6,632,491, the disclosure of which is hereby incorporated herein by reference. In the '491 patent for example, a solar management coating (e.g., low-E coating) is provided on the inner surface of one of the glass substrates of an IG window unit so as to protect a building interior against infrared (IR) radiation and the heat generated thereby. Coated glass substrates of IG units often have to be heat treated (e.g., tempered), prior to IG unit assembly, to meet certain code requirements.

FIG. 1 is a flowchart illustrating processing steps carried out during the conventional manufacture of an IG window unit. First, a glass substrate is coated with a low-E and/or solar control coating (step 1). An example low-E coating is typically a multi-layer coating which includes at least one IR reflecting layer of a material such as silver that is sandwiched between at least a pair of dielectric layers. The coating is typically applied via sputtering or the like. After the coating is applied to the glass substrate, the coated sheet is dusted with Lucor™ powder for purposes of protection (step 3). As is known in the art, the Lucor powder helps separate the coated sheets from one another during shipment to an IG unit fabricator, because during shipment a plurality of coated sheets are typically wrapped in a single rack. In particular, the powder is provided in order to reduce the likelihood of damage (scratching) occurring during shipment of the coated sheets.

Once the dusted coated sheets arrive at the IG unit fabricator, the fabricator typically stores the coated sheets in a rack or on a pallet (step 5). When the sheets are ready to be used, the coated sheets are each cut into smaller piece(s) (step 7) and edge seamed (step 9) as known in the art. Following cutting and edge seaming, the coated sheets are washed at a washing station using water and optionally soap of some sort (step 11). Following washing, a post-wash handling period typically occurs where the coated sheet is handled by operators or the like some of which tend to wear gloves (step 13).

Thereafter, the coated sheets are placed in a furnace and are thermally tempered therein (step 15). Thermal tempering at the fabricator typically involves heat treatment of a coated sheet using furnace temperature(s) of at least 580 degrees C., more preferably of at least about 600 degrees C. and still more preferably of at least 620 degrees C. An example heat treating furnace temperature is from 600 to 700 degrees C. This tempering and/or bending can take place for a period of at least 4 minutes, at least 5 minutes, or more in different situations.

Unfortunately, the process described above with regard to FIG. 1 is undesirable in that the coated glass sheets are often damaged during the process. Coated glass sheets are sometimes less durable while in the annealed state (i.e., prior to tempering). Thus, the glass sheets provided with low-E coatings thereon are highly susceptible to damage during each of steps 3, 5, 7, 9, 11 and 13 illustrated in FIG. 1. The coated side of the coated sheets are the most vulnerable to damage (e.g., scratching) in this regard.

For example, coated sheets are often scratched due to one or more of: (a) rubbing up against other sheets or the like during shipment; (b) pliers used by glass handlers during and/or proximate steps 7 and 9; (c) abrasion caused by gloves worn by glass handlers during any of steps 3, 5, 7, 9, 11 and 13; (d) brushes during washing step 11; and (e) other types of rubbing/abrasion caused during any of steps 3, 5, 7, 9, 11, and 13. Additionally, corrosion is also a significant cause of damage and is often caused by high humidity conditions, acid rain, and/or other materials which tend to collect on the coated articles during transport, storage and/or handling.

While the aforesaid types of damage often occur prior to heat treatment (e.g., tempering), the tempering of the coated sheets typically magnifies such damage. For example, a minor bit of corrosion which was caused pre-tempering can lead to a significant blemish upon heat treatment which causes the coated sheet to be scrapped. The same is true for scratch damage because scratches in a coating allow oxidation to occur deep within the coating and possibly at the silver layer(s) during heat treatment (e.g., tempering) since heat treatment is typically conducted in an oxygen-inclusive atmosphere. Thus, the damage to a coated article often tends to be worse following heat treatment. Accordingly, it can be seen that yields appreciably suffer due to pre-HT damage that tends to occur to coated glass sheets.

In view of the above, it can be seen that there exists a need in the art to better protect coated glass sheets in the processing stages prior to heat treatment (e.g., prior to tempering). In particular, increased protection against mechanical abrasion and environmental damage is needed. Over the years, numerous attempts have been made in this regard.

The dusting of coated sheets with Lucor powder separator is carried out in an attempt to better protect coated glass sheets in the processing stages prior to heat treatment. Unfortunately, Lucor powder provides no protection against corrosion damage, and also is not particularly effective in protecting against scratch damage related to the use of pliers, brushes, gloves and the like (e.g., see FIG. 6).

Encapsulating of racks during shipment has also been tried. However, encapsulating racks is labor intensive and has proven only partially effective during shipment. Moreover, it provides no practical protection during cutting, edge seaming, washing, and post-wash handling processing.

Special processing requirements are also undesirable since this severely limits the number of fabricators capable of performing such processing. Moreover, this significantly adds to the cost of fabrication and is highly undesirable in this regard.

Sacrificial lites (or glazings) have been used during shipment in an attempt to solve the aforesaid problems. In particular, glass sheets are run through the coater with the coater turned off and are subsequently loaded onto the shipping rack at an end thereof with the rack thereafter being wrapped for protection. Because the sacrificial lite is located at the end of the rack, some marginal protection to the other lites in the rack is afforded during shipment. The sacrificial lites are discarded at the fabricator. However, this technique is undesirable in that it requires coater downtime, wasting of glass, and wasting of shipping volume/space/weight, all of which lead to significantly cost increases.

U.S. Pat. No. 6,682,773 to Medwick discloses a technique where a water-soluble temporary protective layer is applied to a coated glass sheet via a liquid solution. In particular, the protective layer is an aqueous coating composition containing a polyvinyl alcohol polymer which may thereafter be removed by washing in water. Unfortunately, the technique of the '773 patent is highly undesirable in that: (a) the coating is applied in liquid form and thus requires a sophisticated heat drying process which takes up valuable time and space; and (b) the coating is typically water soluble and is removed by washing thereby leaving the coated sheet exposed to potential damage during post-wash handling and/or processing. Thus, it can be seen that the technique of the '773 patent is highly undesirable.

U.S. Pat. No. 6,461,731 discloses a protective diamond-like carbon (DLC) layer provided over a low-E coating. However, the DLC layer of the '731 patent cannot practically and reasonably be removed prior to tempering.

U.S. Pat. No. 4,710,426 discloses a protective polymeric layer on a coated sheet. However, the isocyanate used in the '426 system prevents the protective polymeric layer from being practically removed in a reasonable manner.

In view of the above, it can be seen that there exists a need in the art to better protect coated glass sheets in the processing stages prior to heat treatment (e.g., prior to tempering) in an efficient manner such that a protective layer(s) can be easily removed in a processing step prior to tempering. In particular, increased protection against mechanical abrasion and environmental damage is needed in steps leading up to heat treatment (e.g., thermal tempering).

In certain example embodiments of this invention, a temporary protective coating is provided on a glass substrate that is coated with a multi-layer low-E coating. The temporary protective coating includes one or more layers and is located on the glass substrate over at least the low-E coating.

In certain example embodiments, the temporary protective coating is designed such that it can be applied over a low-E coating in an efficient manner without the need for any sort of lengthy curing procedure. In this regard, the temporary protective coating is preferably applied in solid form (i.e., as opposed to liquid form) so that no significant curing is needed of the protective coating. Moreover, in certain example embodiments of this invention, the temporary protective coating is designed such that it can be easily removed by simply peeling it off just prior to heat treatment (e.g., just prior to tempering). In certain example embodiments, the temporary protective coating is designed such that it is not water soluble so that it remains on and protects the low-E coated glass substrate during washing step(s) and thereafter during at least some post-wash handling step(s).

In certain example embodiments of this invention, there is provided a method of making a window, the method comprising: forming a multi-layered low-E and/or solar control coating on a glass substrate; providing at least two flexible protective sheets in non-liquid form to the glass substrate over at least part of the low-E coating; applying at least one protective coating in liquid form, before and/or after the flexible protective sheets are provided, so as to reduce one or more gaps formed between the low-E coating and the flexible protective sheet(s) and/or between the flexible protective sheets; cutting, edge seaming, and/or washing the coated article with the protective coating and protective sheets thereon, and before or after the cutting, edge seaming and/or washing peeling the protective sheets and at least part of the protective coating off of the top surface of the low-E and/or solar control coating.

In other example embodiments of this invention, there is provided a method of making an insulating glass (IG) window unit, the method comprising: forming a multi-layered low-E coating on a glass substrate, wherein the low-E coating comprises at least one infrared (IR) reflecting layer comprising silver sandwiched between at least first and second dielectric layers; adhering at least two flexible protective sheets in non-liquid form to a top surface of the low-E coating via at least an adhesive layer to form a protected coated article; applying at least one protective coating in liquid form directly on the low-E coating and/or over at least one of the flexible protective sheets in order to reduce one or more gaps formed between the low-E coating and the flexible protective sheet(s) and/or between the flexible protective sheets; following applying and curing of the protective coating, shipping the protected coated article to a fabricator of IG window units; the fabricator cutting the protected coated article into an appropriate shape and size with the protective sheets thereon, edge seaming the protected coated article with the protective sheets thereon, and/or washing the protected coated article with the protective sheets thereon, so that following the cutting, edge seaming, and/or washing the protective sheets and protective coating remain at least partially adhered to the top surface of the low-E coating; following said cutting, edge seaming, and/or washing, peeling the protective sheets off of the top surface of the low-E coating to form an unprotected coated article, and also removing at least part of the protective coating when peeling off the protective sheets; after peeling the protective sheets off of the top surface of the low-E coating, thermally tempering the coated article including the glass substrate and low-E coating; and after said tempering, coupling the tempered coated article including the glass substrate and low-E coating to another glass substrate to form an IG window unit.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
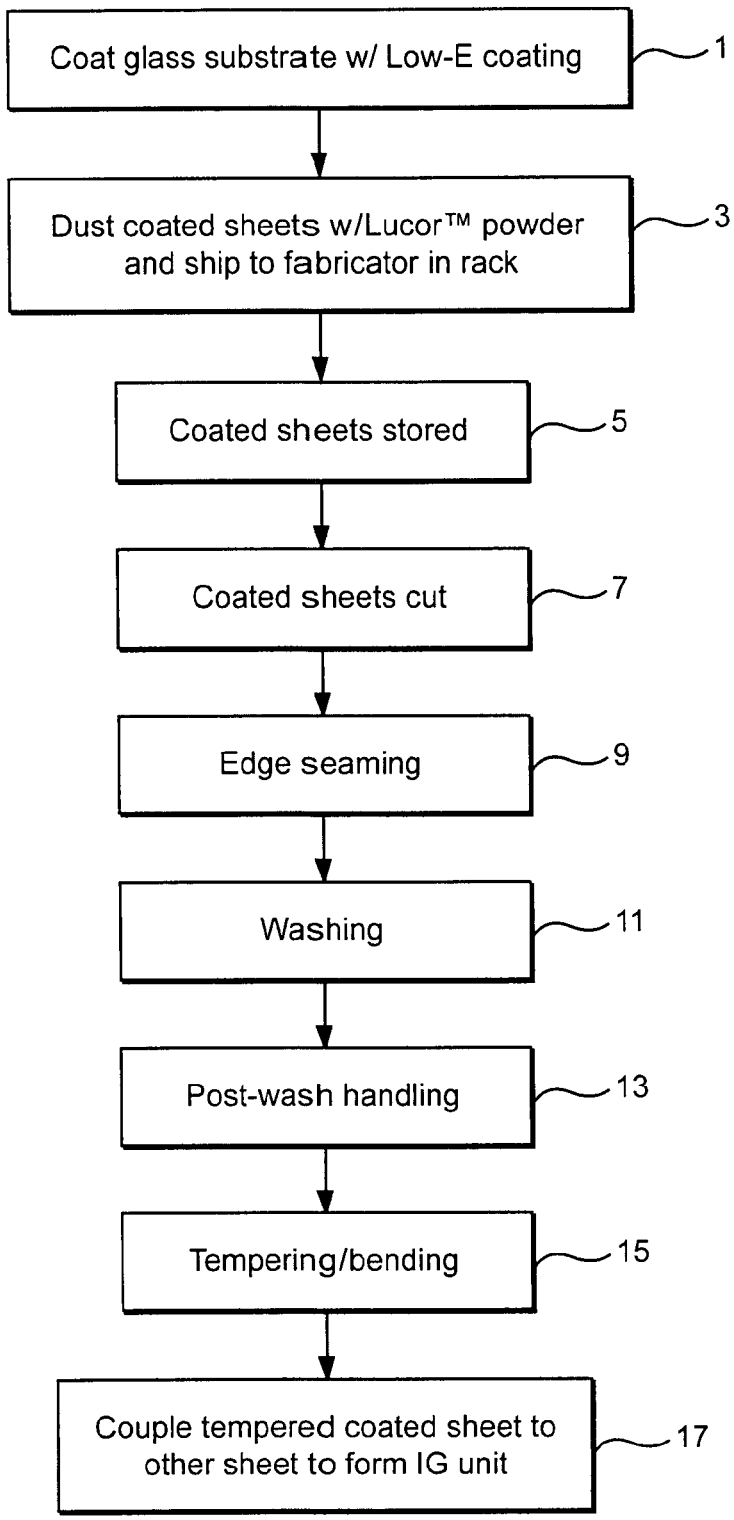
FIG. 1 is a flowchart illustrating a conventional method of making an IG window unit.

A temporary protective coating, having one or more layers, is provided on a glass substrate that is coated with a multi-layer low-E coating in certain embodiments of this invention. The temporary protective coating is typically provided on the substrate over a multi-layer low-E coating, where the low-E coating typically includes at least one infrared (IR) reflecting layer of a material comprising silver or the like. In certain example instances, the IR reflecting layer(s) may be sandwiched between at least a pair of dielectric layers.

In certain example embodiments, the temporary protective coating is designed such that it can be applied over a low-E coating in an efficient manner without the need for any sort of lengthy curing procedure (e.g., without the need for convective air drying, radiant heat drying, convective heat drying, heat drying, vacuum drying, and/or radiation curing such as UV, IR or RF curing). In this regard, the temporary protective coating is preferably applied in solid sheet and/or tape form (i.e., as opposed to liquid form) so that no true curing is needed. For example, the temporary protective coating can be easily applied via lamination or the like in an efficient and reasonable manner.

In certain example embodiments of this invention, the temporary protective coating is designed such that it can be easily removed by simply peeling it off just prior to heat treatment (e.g., just prior to tempering). It may be peeled off by hand (by an operator), or alternatively may be peeled off via a robot in certain other embodiments of this invention. Thus, certain example embodiments of this invention allow fabricators to more aggressively handle and/or process coated glass sheets prior to heat treatment without running a significant risk of damage. This permits yields to be increased, and costs cut.

It has been found that the use of the protective layer discussed herein allows of yields to be improved by at least 50%, and also allows significant post-HT defects to be reduced by at least 50%, more preferably by at least 75% (e.g., compared to a situation where merely Lucor spacer powder is used as discussed above).

Moreover, surprisingly and unexpectedly, it has been found that the protective layer provides added durability/protection even after it has been removed. It is believed that this may be due to residual material from the adhesive layer which may remain on the coating following peeling off of the protective layer. This residual material from the adhesive layer, left on the coating for durability purposes after removal of the protective layer and most of the adhesive layer, is then burned off during heat treatment (e.g., tempering) so that it does not create optical problems or the like. This residual added durability/protection is highly advantageous in processing/handling which occurs between the time of protective layer removal and heat treatment. This unexpected result represents a significant advantage in the art.

In certain example embodiments, the temporary protective coating is not water soluble so that it remains on and protects the low-E coated glass substrate during washing step(s) and thereafter during at least some post-wash handling step(s). Thus, the coated sheet is not highly susceptible to damage (e.g., scratching and/or corrosion) during washing or during certain post-wash handling procedures.

Figure 2:
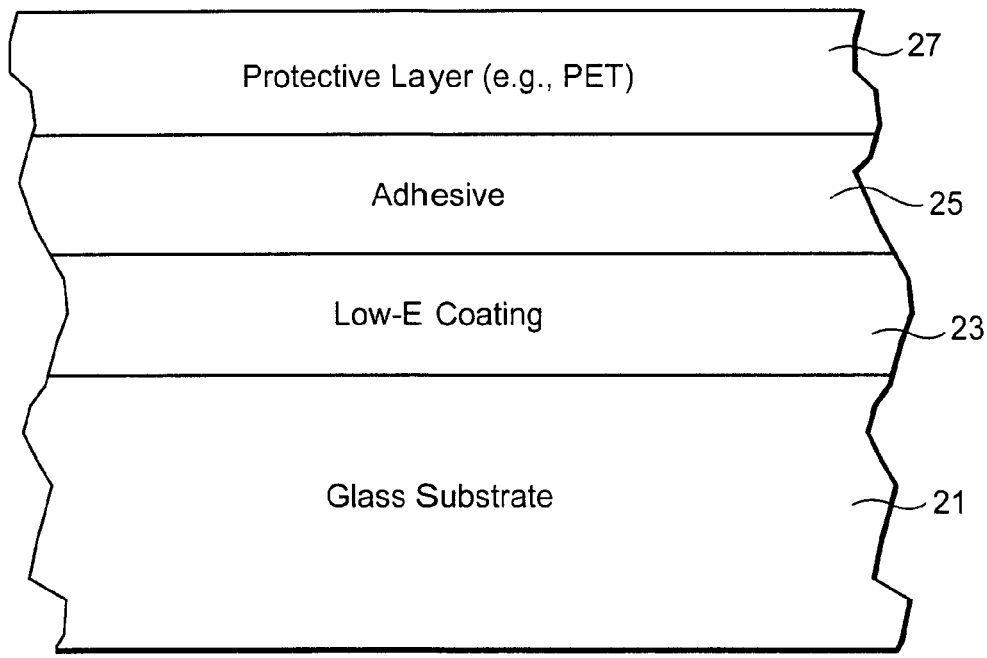
FIG. 2 is a cross-sectional view of a coated article according to an example embodiment.

FIG. 2 is a cross sectional view of an intermediate-stage coated article according to an example embodiment of this invention. The coated article of FIG. 2 is referred to as an "intermediate-stage" coated article because it typically exists during only a particular stage of the manufacturing process before the final product is completed and sold. As shown in FIG. 2, the coated article includes a glass substrate 21 which supports a low-E coating 23. Provided on the substrate 21 over the low-E coating is a protective layer(s) 27 that is optionally adhered to the low-E coating via adhesive layer 25.

Low-E coating 23 may be any suitable type of low-E coating in different embodiments of this invention. For example, and without limitation, any of the coatings in any of the following U.S. patents may be used as the coating 23: U.S. Pat. Nos. 6,461,731; 6,447,891; 6,602,608; 6,576,349; 6,514,620; 6,524,714; 5,688,585; 5,563,734; 5,229,194; 4,413,877 and 3,682,528, all of which are hereby incorporated herein by reference. In certain example embodiments, the top layer of the low-E coating is of or comprises silicon nitride which may or may not be doped with a metal such as Al and/or stainless steel.

Adhesive 25 is a pressure sensitive adhesive (PSA) in certain example embodiments of this invention. In certain instances, the adhesive layer 25 may be of or comprise an acrylic based material. Adhesive 25 provides a low level of adhesion of the protective layer 27 to the top of the low-E coating in certain embodiments thereby permitting the protective layer 27 and most if not all of the adhesive layer 25 to be easily removed by peeling off when desired. As explained above, it has been surprisingly been found that the protective layer provides added durability/protection even after it has been removed. It is believed that this may be due to residual material from the adhesive layer 25 which may remain on the coating following peeling off of the protective layer 27 and at least part of layer 25. This residual material from the adhesive layer 25, left on the coating for durability purposes after removal of the protective layer and most of the adhesive layer, is then burned off during heat treatment (e.g., tempering) so that it does not create optical problems or the like.

Protective layer 27 may be of or comprise polyethylene in certain example embodiments of this invention. Other suitable materials may also be used in certain instances. In certain example embodiments of this invention, protective layer 27 has a visible transmission of less than 70% (measured regarding all visible wavelengths of light), more preferably less than 60%, and most preferably less than 50% (thus, the optics of the coated article are undesirable when the protective layer 27 is thereon). In certain example instances, the protective layer 27 may be blue or otherwise colored. The blue or blue/green coloration of layer 27 is advantageous in that it allows edges of the layer 27 to be clearly seen by operators such as peelers, and also permits handlers to be able to easily determine whether or not the protective layer 27 is still on the coated substrate. This is helpful in preventing coated articles with layer 27 thereon from being placed into the heat treating furnace before layer 27 has been removed by peeling or the like. In certain example embodiments of this invention, protective layer 27 is from about 1-3 mils thick, more preferably about 2 mils thick, and is in solid flexible sheet form so as to be capable of being stored on a roll or the like before application over the low-E coating. In one example embodiment of this invention, layers 25, 27 may be obtained from Nitto Denko, under the tradename 5057A film tape.

Figure 3:
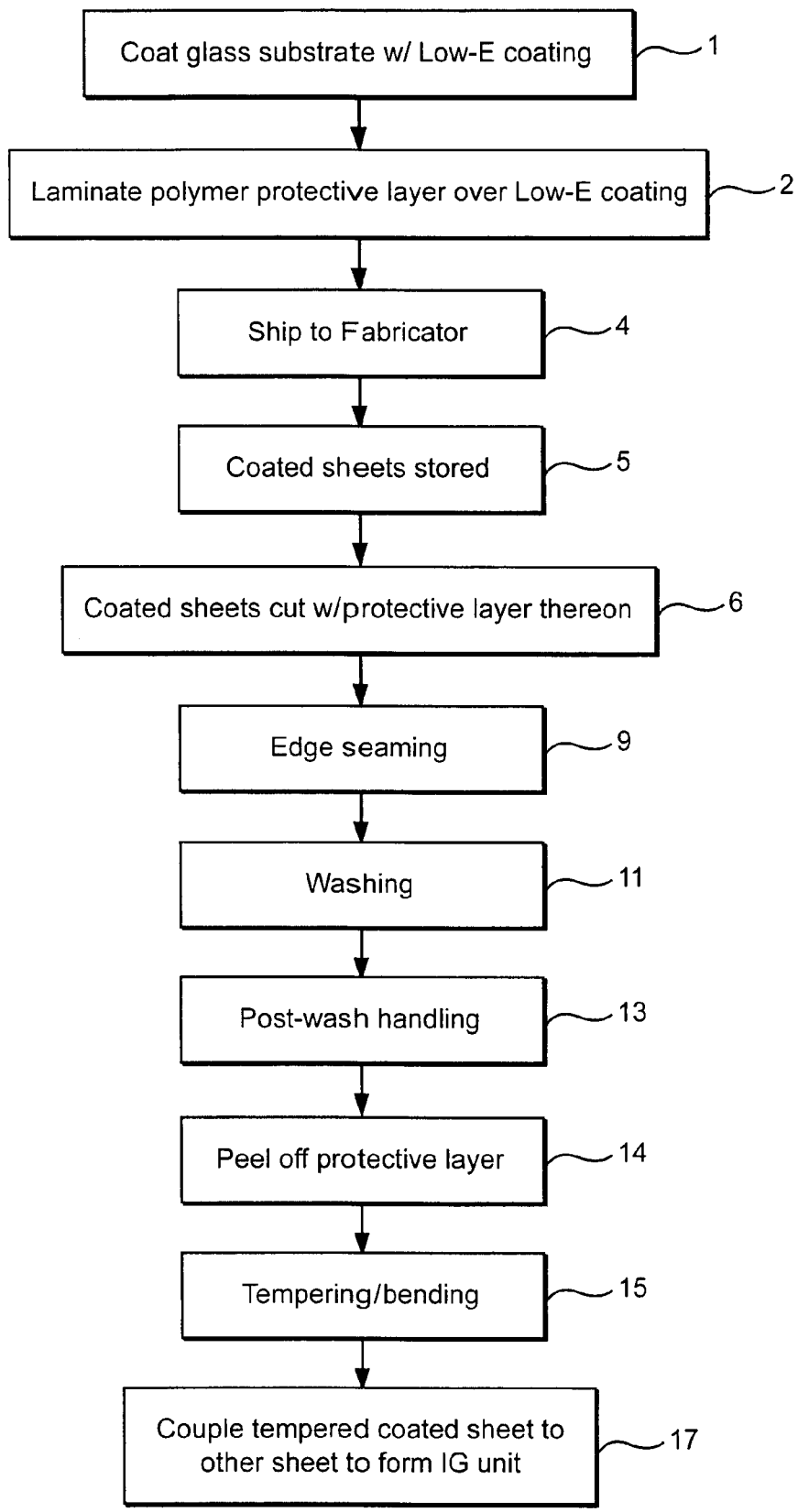
FIG. 3 is a flowchart illustrating certain example steps performed in an example embodiment.

FIG. 3 is a flowchart illustrating certain steps carried out according to an example embodiment of this invention during the manufacture of an IG window unit. First, a glass substrate 21 is coated with a low-E coating 23 (step 1). Example low-E coatings 23 which may be used are discussed above. The low-E coating is typically a multi-layer coating 23 which includes at least one IR reflecting layer of a material such as silver that is sandwiched between at least a pair of dielectric layers. The coating 23 is typically applied via sputtering or the like. After the coating 23 is applied to the glass substrate 21, the sheet-like protective layer 27 is adhered to the top of the low-E coating 23 via pressure sensitive adhesive layer 25 (step 2) to form the coated sheet shown in FIG. 2. In certain example embodiments of this invention, protective layer 27 may be stored on a roll (not shown). In such instances, sheet material 27 fed from the roll may be brought into a nip between a biasing roller (not shown) and the coated article with the low-E coating thereon. In the nip, the roller presses the protective sheet layer 27 downward toward the top of the low-E coating thereby adhering the layer 27 to the top of the low-E coating via adhesive layer 25. In certain example embodiments of this invention, the coating is applied at a coated article surface temperature of from 60 to 120 degrees F., more preferably from about 90 to 120 degrees F., and most preferably from about 90-110 degrees F., and sometime at temperatures above 100 degrees F. This is because the coated sheet is at an elevated temperature due to the coater used to apply the low-E coating on the substrate. Alternatively, a bench-top laminator may be used to laminate the protective layer 27 to the low-E coating via adhesive layer 25 using typical lamination technology.

After the protective layer 27 has been applied over the low-E coating, the coated article is positioned in a rack along with a plurality of other such articles, and the rack is thereafter shipped from the coater to the fabricator in the rack (step 4). Optionally, in certain example embodiments of this invention, it is possible to coat or dust the coated articles with Lucor™ powder for purposes of protection even after the protective layer 27 has been applied. The Lucor spacer powder may help separate the coated sheets from one another during shipment to an IG unit fabricator.

Once the coated sheets arrive at the IG unit fabricator, the fabricator typically stores the coated sheets in a rack or on a pallet with the protective layer(s) 27 thereon (step 5). When the sheets are ready to be used, the coated sheets are each cut into smaller piece(s) (step 6) and edge seamed (step 9) with the layers 25, 27 still thereon. Following cutting and edge seaming, the coated sheets are washed at a washing station using water and optionally soap of some sort, again with the layers 25, 27 still thereon (step 11). Typically, the protective layer 27 is not water soluble, so that the layer 27 dose not come off during the washing step 11. This is advantageous in that it permits the coated sheet to be protected from abrasion from brushes used during the washing, and also permits the protective layer 27 to continue to protect the coated sheet during post-wash handling 13. Following washing, such a post-wash handling period typically occurs where the coated sheet is handled by operators or the like some of which tend to wear gloves (step 13).

Just before the coated article is to be placed in a heat treating furnace (e.g., thermal tempering and/or bending furnace), the protective layer 27 and at least part of adhesive layer 25 are peeled off of the coated glass substrate by an operator or robot thereby leaving the low-E coating 23 on the glass substrate 21 (step 14). As explained above, it is possible for residual portions of the adhesive layer 25 to remain on the substrate over the low-E coating even after the peeling off step. As mentioned above, such residual portions of the adhesive layer 25 may help protect the coated article just before and during introduction of the coated article into the furnace. Thereafter, once the coated article comprising the glass substrate with low-E coating thereon is placed in the furnace, the coated article is heat treated sufficiently to thermally temper and/or heat bend the coated article (step 15). Thermal tempering at a fabricator typically involves heat treatment of a coated sheet using furnace temperature(s) of at least 580 degrees C., more preferably of at least about 600 degrees C. and still more preferably of at least 620 degrees C. This tempering can take place for a period of at least 4 minutes, at least 5 minutes, or more in different situations. As mentioned above, during such heat treatment, any residual portion of the adhesive layer 25 is burned off.

Alternatively, it is possible that in certain embodiments of this invention that the protective layer 27 (and at least part of adhesive 25) is peeled off just prior to introduction of the coated sheet into a tempering or bending washer at the fabricator.

The coated article, including substrate 21 and low-E coating 23 in monolithic form, may in certain example embodiments have a visible transmission of at least 70% after removal of the layers 25, 27, and/or following heat treatment.

Figure 4:
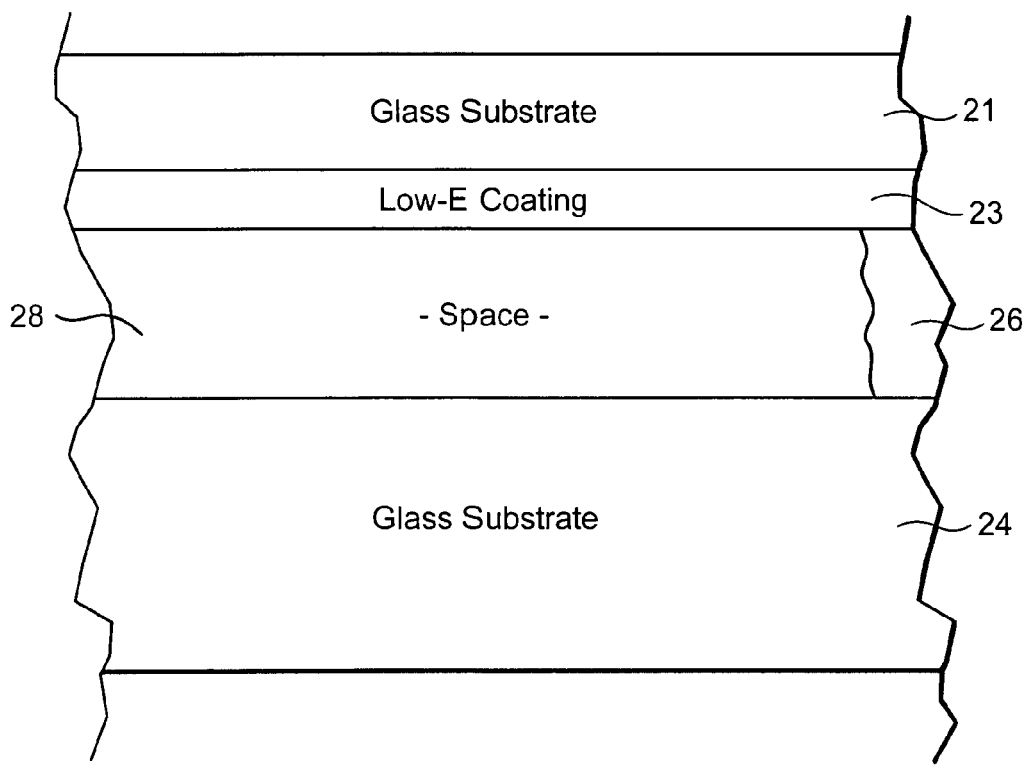
FIG. 4 is a cross-sectional view of an IG unit coated article according to an example embodiment.

After being heat treated, the coated sheet is coupled to another glass or plastic sheet via at least one spacer and/or sealant to form an IG window unit (step 17). Typically, an IG window unit may include two spaced apart substrates 21, 24 as shown in FIG. 4. Example IG window units are illustrated and described, for example, in U.S. Pat. Nos. 5,770,321, 5,800,933, 6,524,714, 6,541,084 and US 2003/0150711. FIG. 4 illustrate that an example IG window unit may include the coated glass substrate including glass substrate 21 and coating 23 coupled to another glass substrate 24 via spacer(s) 26, sealant(s) or the like with a gap 28 being defined therebetween. This gap 28 between the substrates in IG unit embodiments may in certain instances be filled with a gas such as argon (Ar), or alternatively may be filled with air. An example IG unit may comprise a pair of spaced apart clear glass substrates each about 4 mm thick, one of which is coated with a coating herein in certain example instances, where the gap between the substrates may be from about 5 to 30 mm, more preferably from about 10 to 20 mm, and most preferably about 16 mm. In certain example IG unit embodiments of this invention, the coating is designed such that the resulting IG unit (e.g., with, for reference purposes, a pair of 4 mm clear glass substrates spaced apart by 16 mm with Ar gas in the gap)

has a U-value of no greater than 1.25 W/(m²K), more preferably no greater than 1.20 W/(m²K), even more preferably no greater than 1.15 W/(m²K), and most preferably no greater than 1.10 W/(m²K). The IG window unit may have a visible transmission of from 50-80% in certain example embodiments of this invention, more preferably from 60-75%.

In view of the above, it can be seen that the protective layer 27, and optionally adhesive 25, serve to protect the coated sheet from damage (e.g., scratching, corrosion and the like) during shipping, unloading, cutting, edge seaming and grinding, robotic handling and human handling. An example benefit is significantly higher fabrication yields for the product. While such protective layers have been previously used to protect UV coatings and the like during shipment, they have not been heretofore used to protect low-E coatings during fabrication steps and the like as discussed herein.

EXAMPLE

Figure 5:
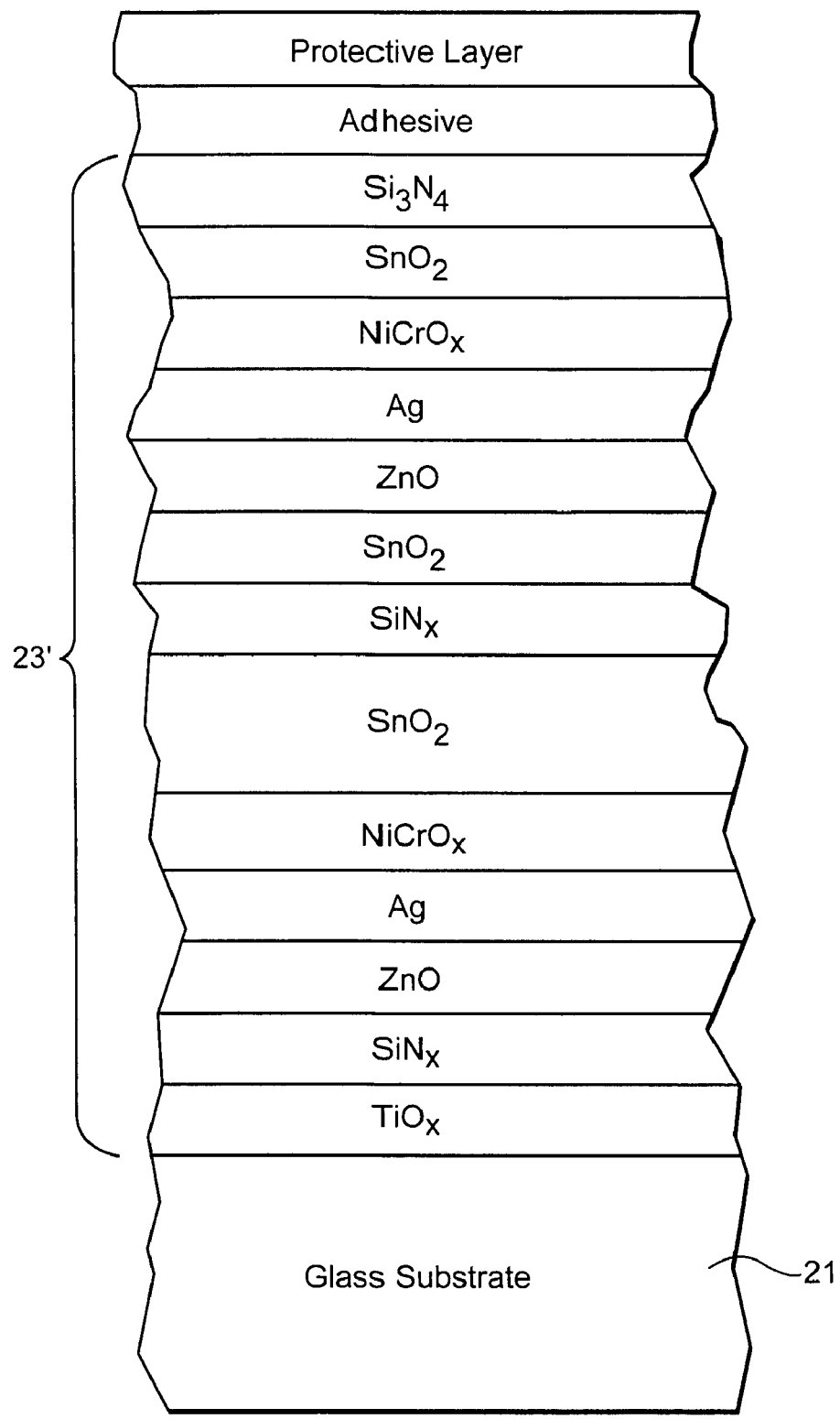
FIG. 5 is a cross-sectional view of a coated article according to an example embodiment.

For purposes of example only, and without limitation, an Example coated article was made and tested. Referring to FIG. 5, a low-E coating 23' was sputtered onto a glass substrate 21. The materials used for the low-E coating 23' are listed below, in order to the glass substrate outwardly; and the approximate thicknesses in the Example are listed in the right-hand column.

| Example Materials/Thicknesses for Low-E Coating 23' | | | |
|---|---|---|---|
| Layer Glass | Preferred Range (Å) | More Preferred (Å) | Example (Å) |
| TiO₂ | 10-150 Å | 20-125 Å | 121 Å |
| Si$_x$N$_y$ | 40-450 Å | 70-300 Å | n/a Å |
| ZnO$_x$ | 10-300 Å | 40-150 Å | 90 Å |
| Ag | 50-250 Å | 80-120 Å | 92 Å |
| NiCrO$_x$ | 10-100 Å | 12-40 Å | 37 Å |
| SnO₂ | 0-1,000 Å | 200-700 Å | 597 Å |
| Si$_x$N$_y$ | 50-450 Å | 80-200 Å | n/a Å |
| SnO₂ | 30-250 Å | 50-200 Å | 100 Å |
| ZnO$_x$ | 10-300 Å | 40-150 Å | 100 Å |
| Ag | 50-250 Å | 80-220 Å | 147 Å |
| NiCrO$_x$ | 10-100 Å | 20-45 Å | 36 Å |
| SnO₂ | 0-750 Å | 40-200 Å | 100 Å |
| Si₃N₄ | 0-750 Å | 80-320 Å | 208 Å |

Further details, advantages, and characteristics of this low-E coating 23', may be found in U.S. Ser. No. 10/797,561, the disclosure of which is hereby incorporated herein by reference. It has surprisingly been found that adherence characteristics between the adhesive 25 and silicon nitride (the top layer of the aforesaid low-E coating) are very good.

Following sputtering of coating 23' onto glass substrate 21, polyethylene protective layer 27 (including 27a and/or 27b) was adhered to the top of the low-E coating via acrylic based adhesive layer 25. In this regard, 5057A blue colored tape from Nitto Denko was used. This coated sheet including layers 25, 27 according to the Example was then subjected to numerous tests, and compared to each of: (a) the same coating not ever covered with layers 25, 27, and (b) the same coating which had previously been covered with similar layers 25, 27 but where the layers had been peeled off. The results of such tests are illustrated in FIG. 6.

Figure 6:
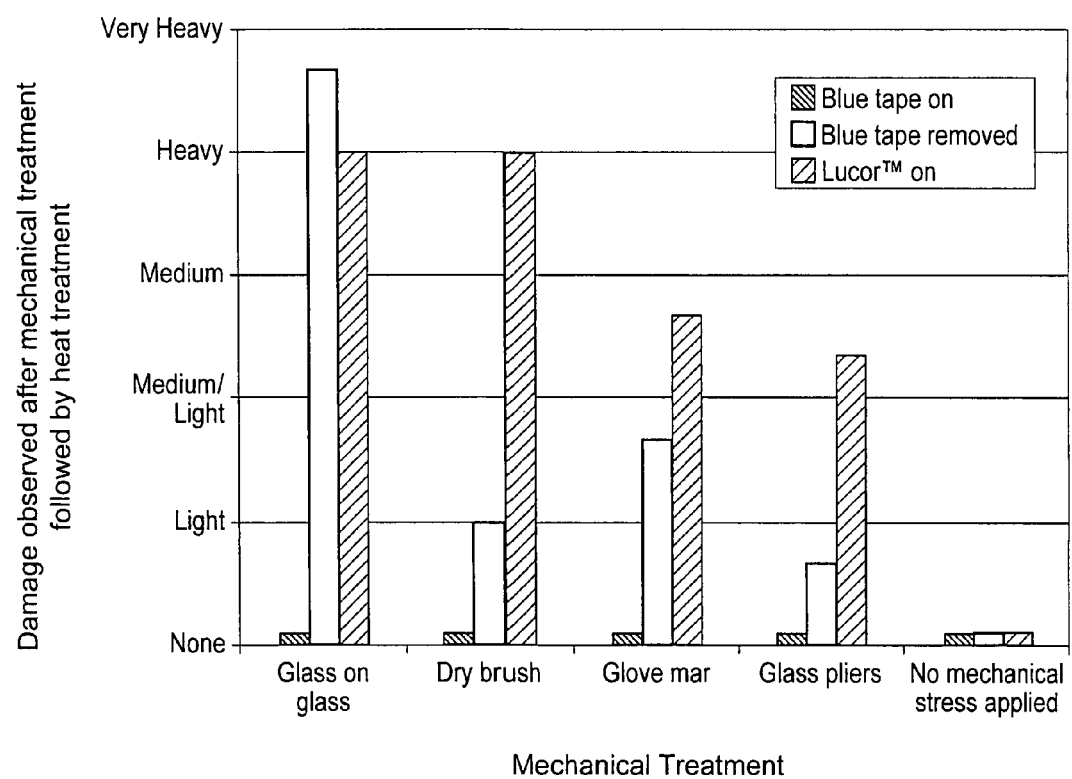
FIG. 6 is a graph illustrating improved mechanical durability associated with certain example embodiments, compared to conventional articles with only Lucor spacer powder applied.

Regarding the various tests illustrated in FIG. 6, the dry brush test was an abrasion test where a dry brush was used to rub the coated sheet in order to simulate a situation where water was unexpectedly cut off in a coated sheet washer. The glove mar test was an abrasion test using a rubbing material similar to that commonly used in gloves of glass handlers. The glass pliers test involved subjected the coated sheet to contact with glass handling pliers.

FIG. 6 shows that the coated sheets with the layers 25, 27 thereon were much less damaged by the various abrasion tests than were the coated articles without such layers thereon. Surprisingly, FIG. 6 also illustrates that the protective layer provides added durability/protection even after it has been removed (see the "blue tape removed" samples illustrated via the light colored bars in FIG. 6). It is believed that this may be due to residual material from the adhesive layer which may remain on the coating following peeling off of the protective layer. This added durability/protection is highly advantageous especially in the context of processing/handling which occurs between the time of protective layer removal and heat treatment.

Thus, in certain example embodiments, an unprotected coated article, after peeling off of the protective sheet and at least part of the adhesive layer, is at least 3 times more resistant (more preferably at least 5 times more resistant) to scratching via an abrasion brush test and/or glove mar test than is a comparative coated article including the glass substrate and low-E coating which never had applied thereto the adhesive layer and protective sheet.

Multiple Protective Layers

The example embodiments described above have been used successfully in connection with low-E coated glass substrates. See, for example, U.S. Publication Nos. 2005/0210921 and 2006/0065350, each incorporated herein by reference in its entirety. However, further refinements to these basic techniques are still possible. For example, it would be advantageous to accommodate a variety of differently sized coated glass articles. The protective layer described above currently is available in widths of up to approximately 2.6 meters. For example, plastic films (e.g., polyethylene films) having pressure sensitive adhesive (PSA) coatings on one side of the film that have variable adhesive or tack strengths and that remain substantially chemically inert towards the coated glass surface have been used in the production of many differently sized coated glass articles. But to cover certain larger sized glass, for example, larger protective layers would be required. For example, in the case of European jumbo size glass, a width of 3.21 meters would be required. Other sized jumbo lites may similarly require multiple protective layers.

Currently, it is not possible to apply pressure sensitive adhesives to films this wide. Accordingly, means for utilizing two or more rolls of film have been sought after. It has been determined that all materials that were overlapped produced a small gap, which acted as a capillary to transport cutting fluid, grinding coolant, and washer water along the overlap. The resulting water deposits corroded or left residue on the sputtered coating, which manifested itself as a line on the coating after tempering. Similar lines were observed when the films were applied next to each other (e.g., touching to about 25 mm apart).

Figure 7:
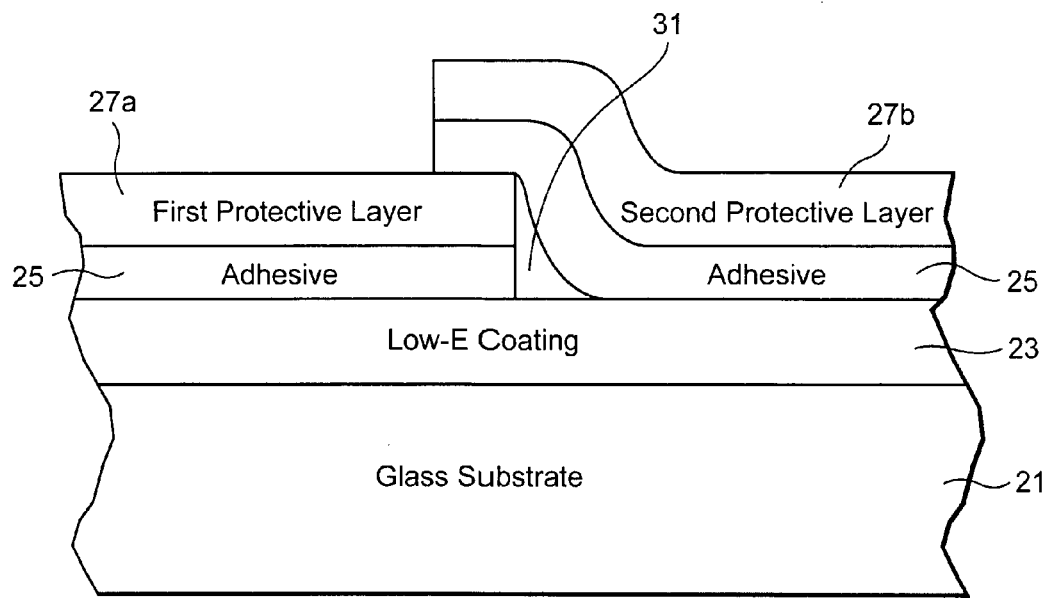
FIG. 7 is a cross-sectional view of a coated article that shows a gap or capillary being formed on a glass substrate when two overlapping protective layers are applied thereto.
Figure 8:
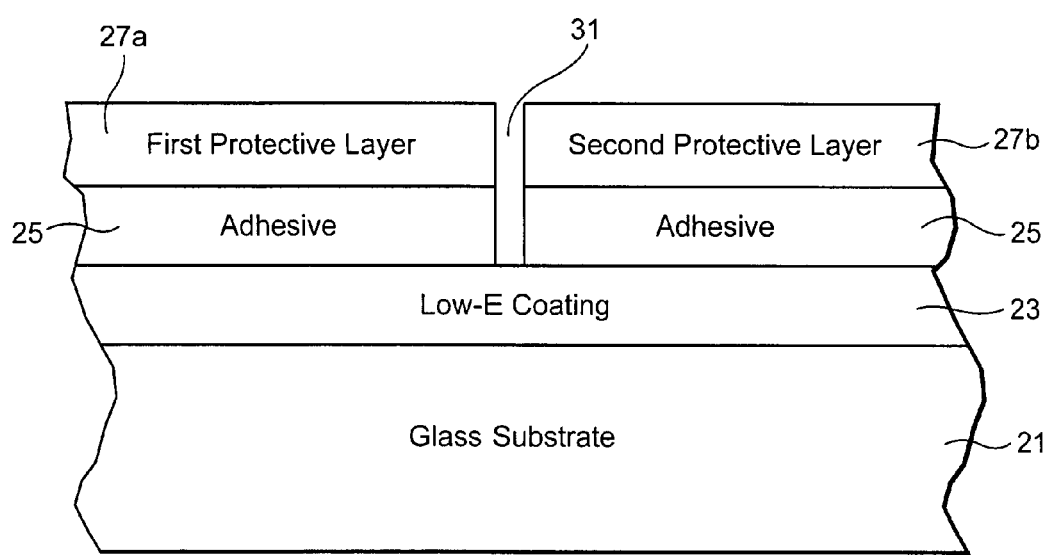
FIG. 8 is a cross-sectional view of a coated article that shows a gap or capillary being formed on a glass substrate when two adjacent protective layers are applied thereto.

By way of example and without limitation, these configurations are shown visually in FIGS. 7 and 8. In particular, FIG. 7 is a cross-sectional view of a coated article that shows a gap or capillary being formed on a glass substrate when two overlapping protective layers are applied thereto, and FIG. 8 is a cross-sectional view of a coated article that shows a gap or capillary being formed on a glass substrate when two adjacent protective layers are applied thereto. As will be appreciated, between the first and second protective layers 27a, 27b, a gap

31 is formed. This gap forms a capillary as noted above, typically regardless of whether the first and second protective layers 27a, 27b are applied in an overlapping configuration (FIG. 7) or in a adjacent (e.g., butt-joined or near butt-joined) configuration (FIG. 8).

To address these and/or other problems, a protecting coating was applied in liquid form above and below the first and second protective layers 27a, 27b. The liquid coating helped reduce the gaps formed between overlapping and/or adjacent protective layers (e.g., the liquid coating effectively filled the gaps). The reduction in the size (and sometimes the complete elimination of) gaps, in turn, reduced (and sometimes even prevented) the related capillaries.

Both solved-based and UV-curable coatings were utilized. The liquid coatings were selected at least based on certain attributes. These attributes included, for example, good adhesion to the protective layers, good adhesion to the coated glass, and ability to be peeled from the coated glass without leaving a residue. Alternatively or in addition, materials that sometimes were not completely removed by peeling but can nonetheless be washed-off or burned-off cleanly during tempering also have been found to be acceptable.

The liquid materials comprising the liquid coating may be applied in various ways onto the glass and/or protective layer(s). For example, it is possible to spray, extrude, and/or roll coat the liquid coatings onto the glass and/or protective layer(s). Various liquid coatings have been determined to be acceptable based on, for example, the above-described attributes. In particular, various solvent-based and UV-curable materials have been tested and identified as suitable for use with the example embodiments described herein. For example, solvent-based masks commercially available from Socomor Aeronautic Finishing Solutions have been found to be useful, including those materials in the series designated by the tradename SOCOMASK and, in particular, the SOCO-MASK PRT-18, as have solvent-based commercially available from General Chemical Corp. including those materials in the series designated by the tradenames COSCOAT, Disc-Coat, and Stripcoat and, in particular, the COSCOAT 4300. For UV-curable materials, the Magna-Cryl 3400 commercially available from Beacon Adhesives, Inc. and, in particular, the Magna-Cryl 3401, have been found to be well suited to certain example embodiments. The UV curable temporary masking resins available under the tradename SpeedMask® available from Dymax Corporation®, particularly in the 723 series, also have been determined to be well suited to certain example embodiments. Certain lower viscosity versions of the 723 series that are custom made for spray applications may also be acceptable. For such materials, the viscosity tends to range from about 500 cps to about 2500 cps at room temperature.

Figure 9A:
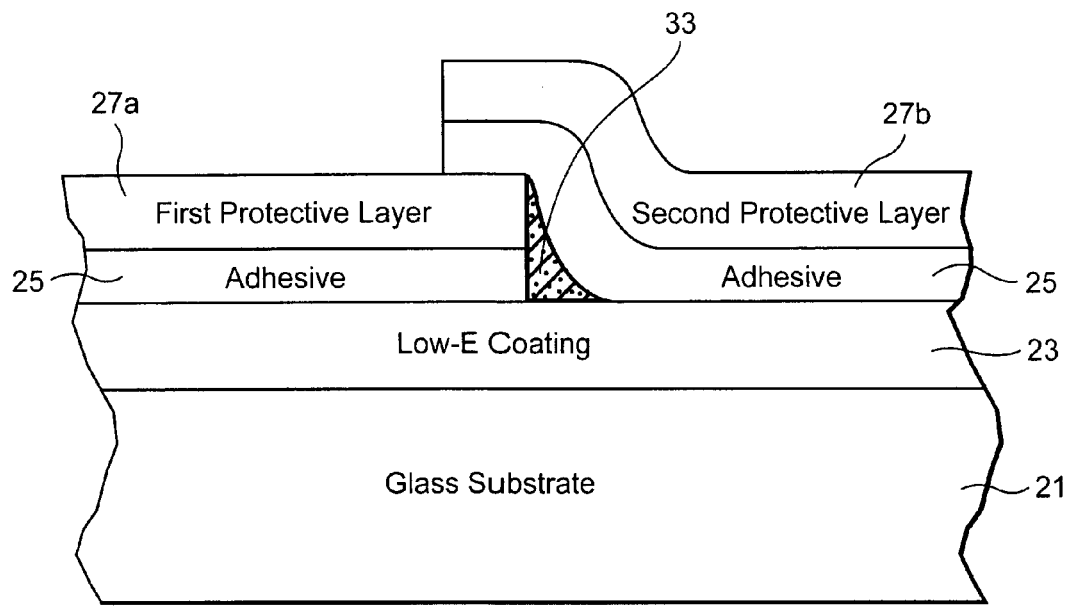
FIG. 9a is a cross-sectional view of a coated article where a liquid coating and two overlapping protective layers are applied to a coated glass substrate according to an example embodiment.

Referring now to FIGS. 9a-12b, a description of the various configurations for the protective layer(s) and liquid coating(s) is provided. FIG. 9a is a cross-sectional view of a coated article where a liquid coating and two overlapping protective layers are applied to a coated glass substrate (e.g., coated with a low-E coating) according to an example embodiment. In FIG. 9a, a glass substrate 21 with a low-E coating 23 is shown. The liquid coating 33 is applied on the coated glass substrate 21 at least proximate to the area where the first and second protective layers 27a, 27b overlap. Note that the term "liquid" as used herein means flowable, namely at least partially flowable.

Figure 9B:
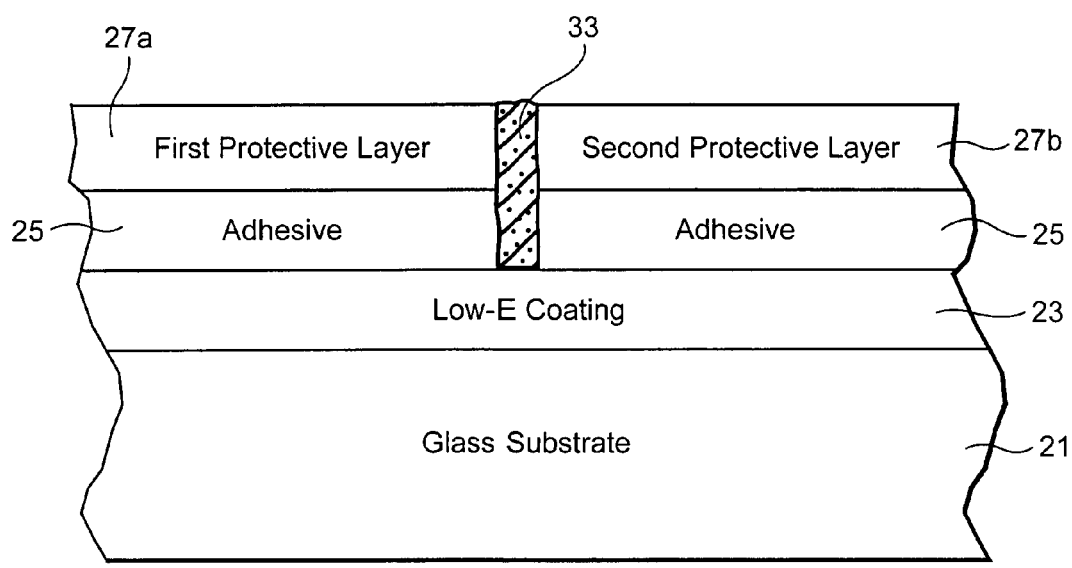
FIG. 9b is a cross-sectional view of a coated article where a liquid coating and two adjacent protective layers are applied to a coated glass substrate according to an example embodiment.

Similarly, FIG. 9b is a cross-sectional view of a coated article where a liquid coating and two adjacent protective layers are applied to a coated glass substrate according to an example embodiment. The liquid coating 33 is applied on the coated glass substrate 21 at least proximate to the area where the first and second protective layers 27a, 27b meet.

Thus, FIGS. 9a-b collectively show how certain example embodiments facilitate the application of at least two protective layers in a side-by-side (e.g., butt-joint or near butt-joint) or overlapping configuration to protect coated glass articles that are larger in size than the plastic films. By way of example and without limitation, in the near butt-joint configuration, the gap between the two plastic films may be, for example, as narrow as a fraction of a millimeter, between about 5-10 mm, or even as wide as several inches. In the overlapping configuration, the size of the overlap can vary, for example, from about 1 mm to about several inches. From the standpoint of post-fabrication (e.g., edge grinding operations) the overlapping configuration has been determined to work particularly well with an overlap of about 1 inch.

Also, by way of example and without limitation, in terms of the materials listed above, the solvent-based coatings have been determined to work particularly well for the butt-join configuration, whereas the UV-curable coatings have been determined to work particularly well for overlapping configuration (e.g., as they do not contain solvents to be trapped under the laminated plastic films). Of course, it will be appreciated that while certain example embodiments work particularly well with materials that may be removed by peeling, the present invention is not so limited. For example, protective coatings that may be selectively applied in either butt-joint or overlapping configurations and removed on demand by water, alkali, and/or by burning at tempering temperatures also may be used.

Figure 10:
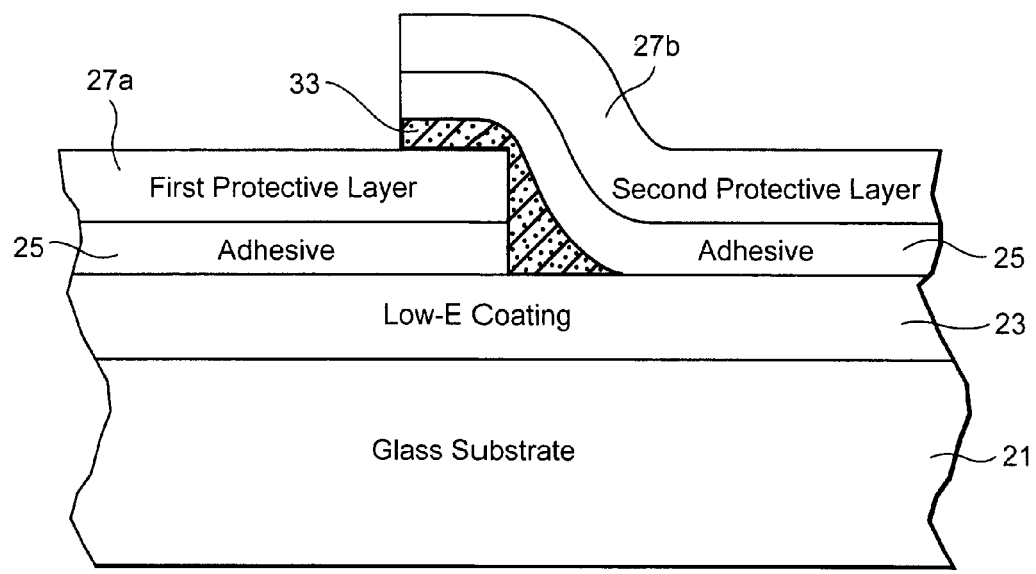
FIG. 10 is a cross-sectional view of a coated article where a liquid coating is applied to a first protective layer, and where a second protective layer is overlapped with the first protective layer proximate to the area at which the first protective layer is coated according to an example embodiment.

FIG. 10 is a cross-sectional view of a coated article where a liquid coating is applied to a first protective layer, and where a second protective layer is overlapped with the first protective layer proximate to the area at which the first protective layer is coated according to an example embodiment. As above, the liquid coating 33 is applied at least at an area proximate to where the first protective layer 27a overlaps with the second protective layer 27b. However, the liquid coating 33 may be applied to one or both of the first protective layer 27a and the second protective layer 27b rather than the coated glass surface.

Figure 11:
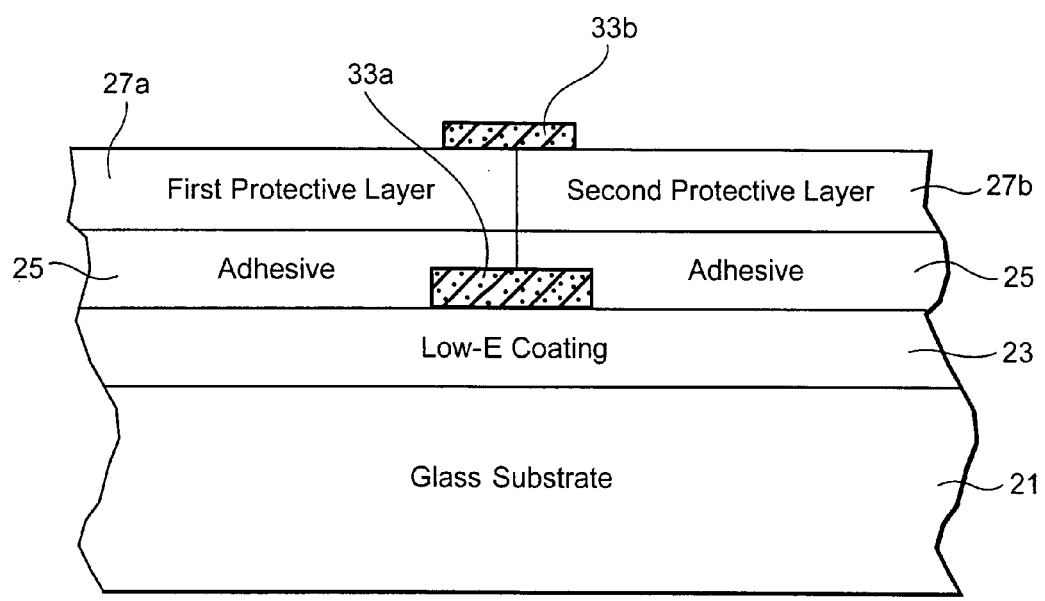
FIG. 11 is a cross-sectional view of a coated article where a first liquid coating is applied to a coated glass substrate underneath two adjacent protective layers and where a second liquid coating is applied over the adjacent protective layers according to an example embodiment.

FIG. 11 is a cross-sectional view of a coated article where a first liquid coating is applied to a coated glass substrate underneath two adjacent protective layers and where a second liquid coating is applied over the adjacent protective layers according to an example embodiment. In FIG. 11, a first liquid coating 33a is applied under at least the abutting ends of first and second protective layers 27a, 27b. Also, a second liquid coating 33b is applied over at least the abutting ends of first and second protective layers 27a, 27b. It will be appreciated that although the first and second protective layers are shown as directly touching each other in FIG. 11, the present invention is not so limited. For example, as described above, the first and second protective layers may be in a spaced-apart relation with a gap formed therebetween as noted above.

Figure 12A:
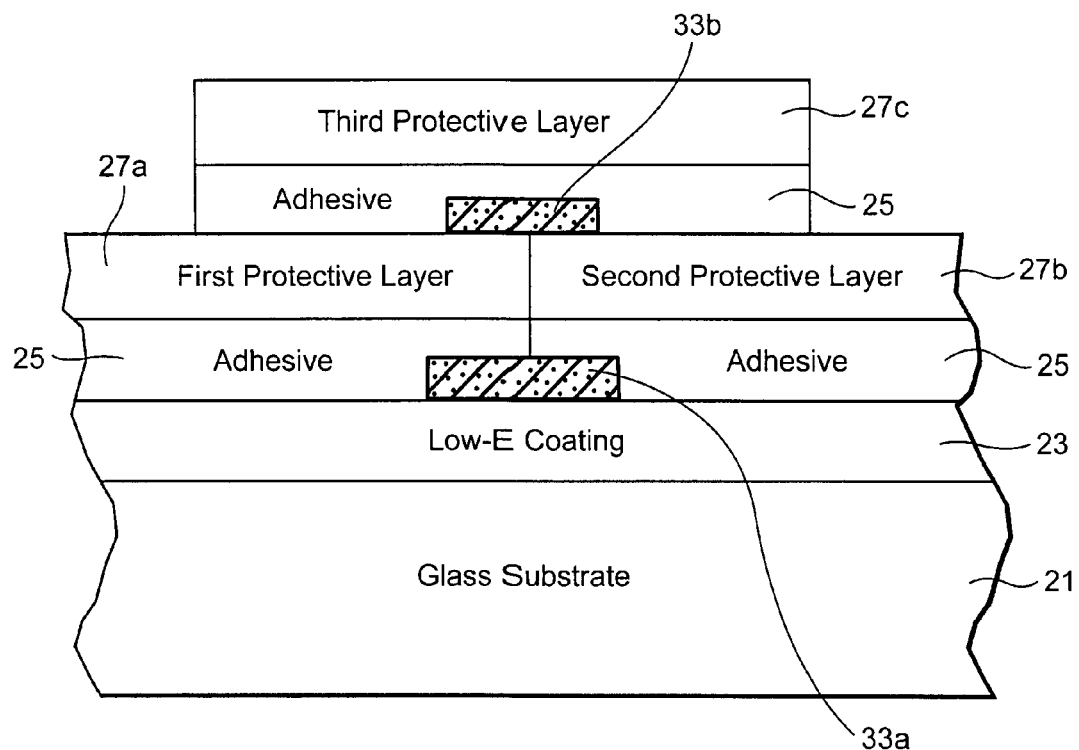
FIG. 12a is a cross-sectional view of a coated article where a first liquid coating is applied to a coated glass substrate underneath two adjacent protective layers, where a second liquid coating is applied over the adjacent protective layers, and where a third protective layer is applied over the second liquid coating according to an example embodiment.

FIG. 12a is a cross-sectional view of a coated article where a first liquid coating is applied to a coated glass substrate underneath two adjacent protective layers, where a second liquid coating is applied over the adjacent protective layers, and where a third protective layer is applied over the second liquid coating according to an example embodiment. A first liquid coating 33a is applied under at least the abutting ends of first and second protective layers 27a, 27b. Also, a second liquid coating 33b is applied over at least the abutting ends of first and second protective layers 27a, 27b. A third protective layer 27c is applied on the second liquid coating 33b so as to at least partially cover the second liquid coating 33b and to at least partially straddle the first and second protective layers 27a, 27b.

Figure 12B:
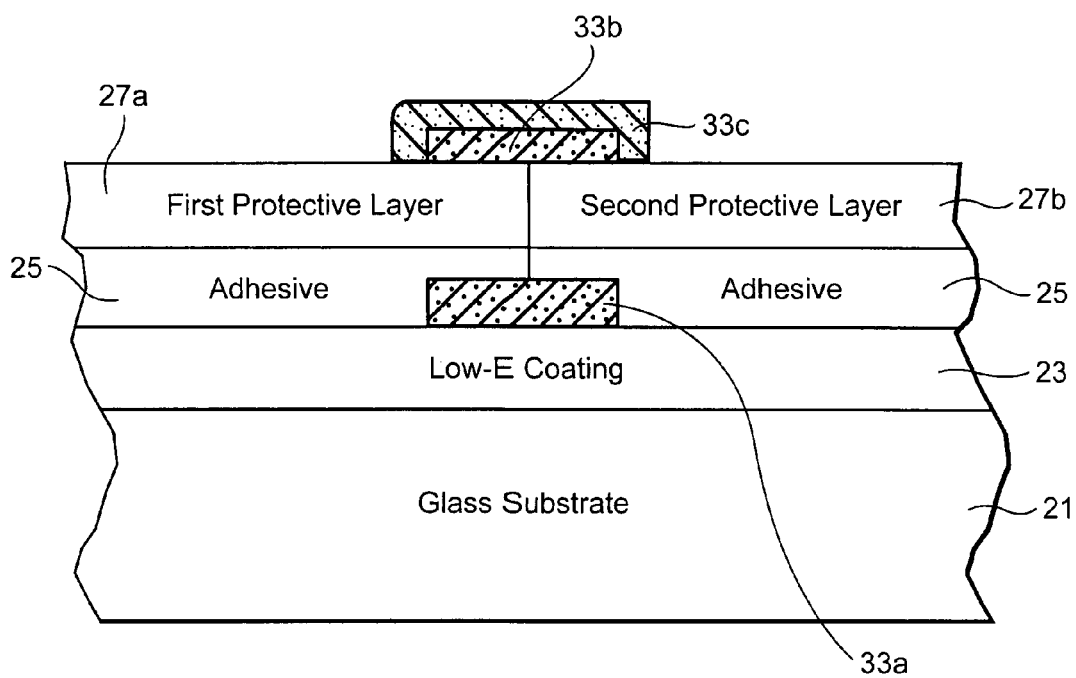
FIG. 12b is a cross-sectional view of a coated article where a first liquid coating is applied to a coated glass substrate underneath two adjacent protective layers, where a second liquid coating is applied over the adjacent protective layers, and where a third liquid coating is applied over the second liquid coating according to an example embodiment.

FIG. 12b is a cross-sectional view of a coated article where a first liquid coating is applied to a coated glass substrate underneath two adjacent protective layers, where a second liquid coating is applied over the adjacent protective layers, and where a third liquid coating is applied over the second liquid coating according to an example embodiment. A first liquid coating 33a is applied under at least the abutting ends of first and second protective layers 27a, 27b. Also, a second liquid coating 33b is applied over at least the abutting ends of first and second protective layers 27a, 27b. A third liquid coating 27c is applied on the second liquid coating 33b so as to at least partially cover the second liquid coating 33b. It also may at least partially straddle the first and second protective layers 27a, 27b. It will be appreciated that although the first and second protective layers are shown as directly touching each other in FIGS. 12a and 12b, the present invention is not so limited. For example, as described above, the first and second protective layers may be in a spaced-apart relation with a gap formed therebetween as noted above.

It will be appreciated that the foregoing configurations are provided by way of example and without limitation. Other configurations may be used in place of, or in addition to, the configurations shown and described herein. It also will be appreciated that the techniques described herein may be used in certain example instances with coated glass substrates and/or non-coated glass substrates. It also will be appreciated that the adhesive layers described above may be formed directly on the protective sheets or may be a separate layer applied to the low-E coating of the glass substrate. In the latter case, for example, certain of the example embodiments described above may be modified to have the protective layers and/or liquid coatings applied to the adhesive layer rather than the low-E coating directly.

Figure 13A:
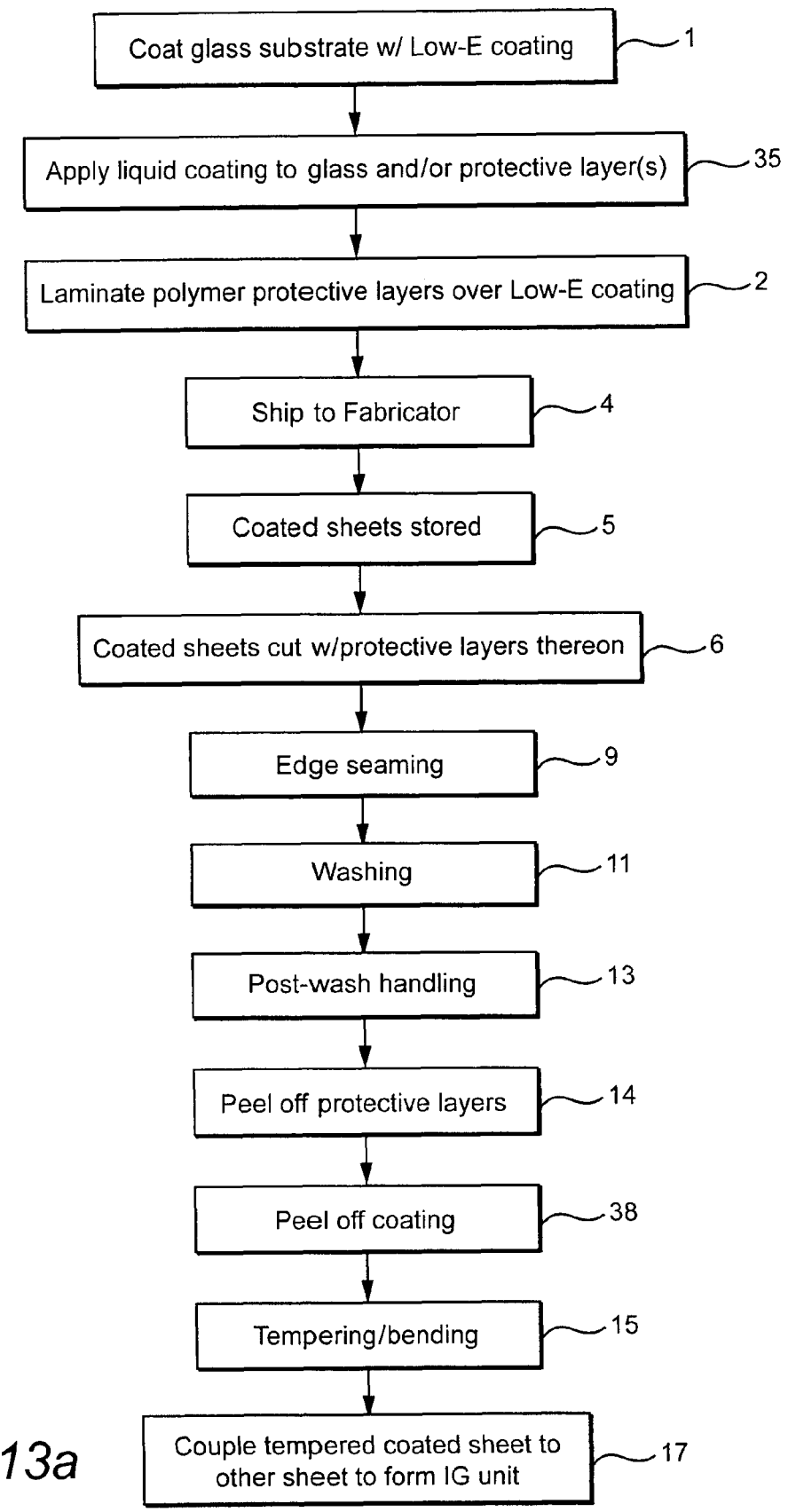
FIGS. 13a-13c are flowcharts illustrating certain example steps performed in certain example embodiments.
Figure 13B:
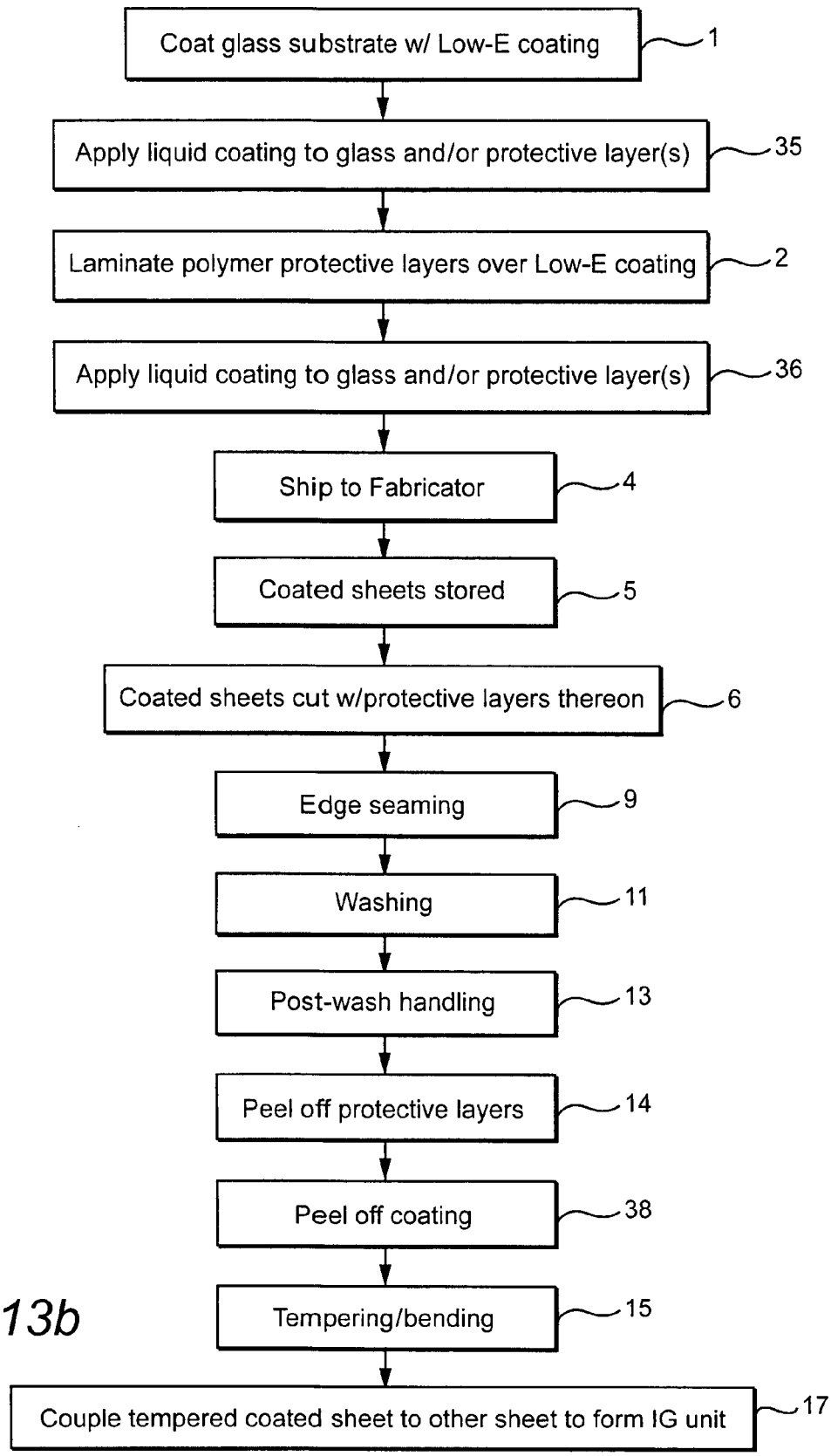
Figure 13C:
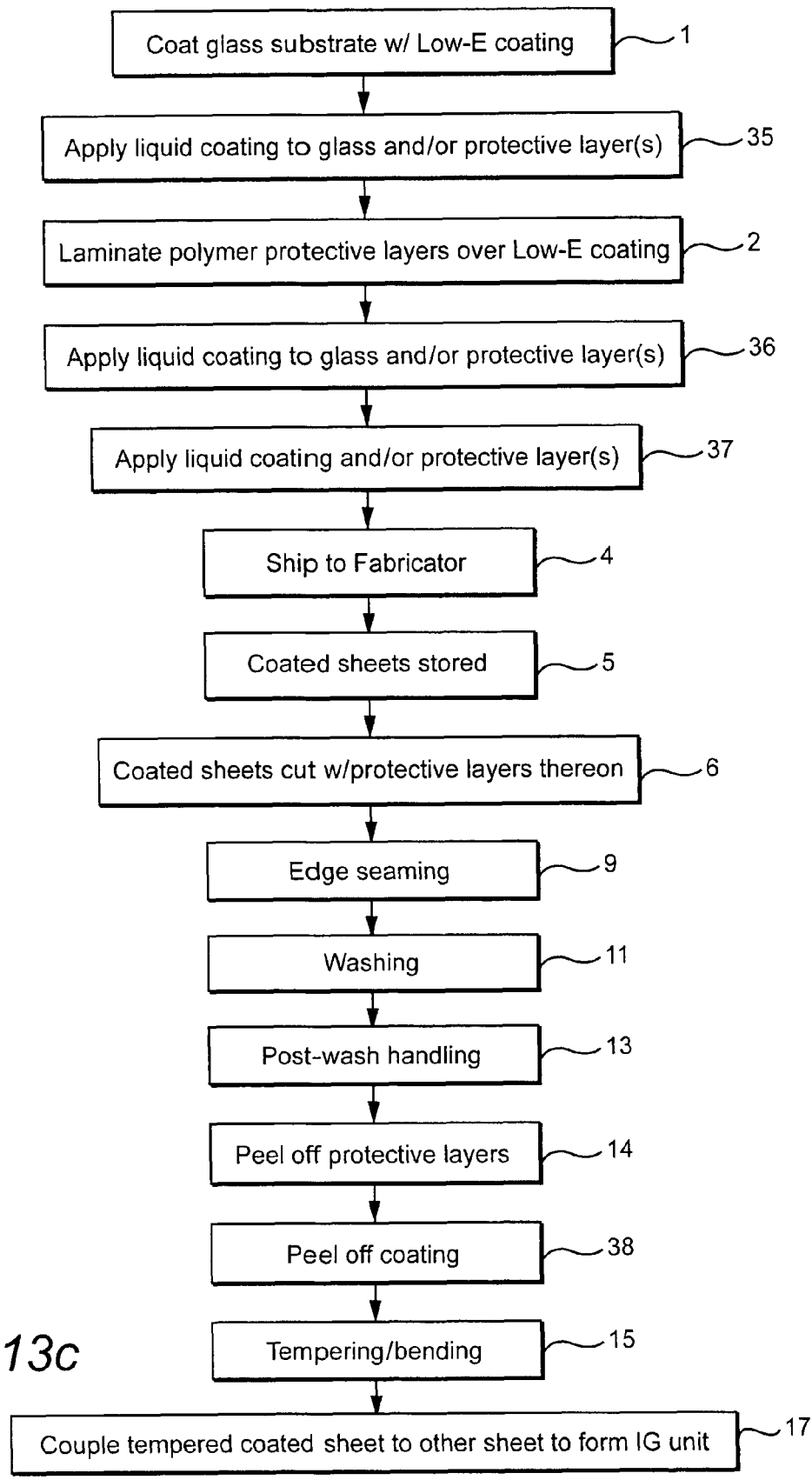

FIGS. 13a-13c are flowcharts illustrating certain example steps performed in certain example embodiments. FIGS. 13a-13c are similar to FIG. 3. However, FIG. 13a requires the additional step of applying a liquid coating to the glass substrate (or the low-E coating formed thereon) and/or protective layer(s) (step 35). This coating ultimately may need to be peeled off (step 38) or, as described above, it may come off during washing, firing, etc. The process shown in FIG. 13a may be used to produce, for example, the intermediate products shown and described with reference to FIGS. 9a, 9b, and 10.

In addition to those steps presented in FIG. 13a, FIG. 13b also requires that a liquid coating be applied to the glass (or the low-E coating formed thereon) and/or protective layer(s) (step 36). This step may need to be performed after the protective layers are disposed on the low-E coating to create a suitable seal via the liquid coating(s). Additionally, multiple peelings may be necessary (e.g., in step 38). The process shown in FIG. 13b may be used to produce, for example, the intermediate products shown and described with reference to FIG. 11. In certain example embodiments, the protective coating(s) 33 (after being applied in liquid form and then curing into a solid or quasi-solid form) is peeled off along with the underlying and/or overlying protective layer(s) 27.

Finally, in addition to those steps presented in FIG. 13b, FIG. 13c also requires that an additional liquid coating and/or protective layer be applied (step 37). The additional liquid coating and/or protective layer may be applied to the liquid coating that exists on top of the first and second protective layers. The process shown in FIG. 13c may be used to produce, for example, the intermediate products shown and described with reference to FIGS. 12a and 12b.

In view of the above, it will be appreciated that certain example embodiments relate to a means of providing full lite coverage with temporary protective film layers including two or more rolls of protective layers (e.g., plastic films) in combination with one or more solvent-based and/or UV-curable liquid coatings. These techniques also may be used to produce IG units.

In certain example embodiments of this invention, there is provided a method of making a window, the method comprising: forming a multi-layered low-E coating on a glass substrate; providing a combination of (i) at least one flexible protective sheet in non-liquid form, and (ii) a wet protective coating that is wet at the time of application, to the glass substrate over at least part of the low-E coating; applying the wet protective coating in liquid form, before and/or after the at least one flexible protective sheet is provided on the substrate over the low-E coating; and after said providing and applying steps, cutting, edge seaming, and/or washing the coated article. In certain example embodiments, a narrow strip of a third non-liquid protective sheet (e.g., of or including TPF) may be applied over a liquid protective coating which overlaps on either side of a gap in a butting configuration. In certain example embodiments, a narrow strip of a third non-liquid protective sheet (e.g., of or including TPF) may be pre-coated with a liquid adhesive before being applied over the low-E coating.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an insulating glass (IG) window unit, the method comprising:

forming a multi-layered low-E coating on a glass substrate, wherein the low-E coating comprises at least one infrared (IR) reflecting layer comprising silver sandwiched between at least first and second dielectric layers;

adhering at least two flexible protective sheets in non-liquid form to a top surface of the low-E coating via at least an adhesive layer to form a protected coated article, wherein one or more gaps is/are formed proximate the flexible protective sheets such that the top surface of the low-E coating is at least partially in contact with the one or more gaps;

applying at least one protective coating in liquid form directly on the low-E coating and/or over at least one of the flexible protective sheets in order to substantially fill the one or more gaps formed between the low-E coating and the flexible protective sheet(s) and/or between the flexible protective sheets to form a temporary protective coating, so as to reduce an occurrence of visible line(s) on the coated article proximate a location of the one or more gaps after any thermal tempering;

following formation of the temporary protective coating, shipping the protected coated article to a fabricator of IG window units;

the fabricator cutting the protected coated article into an appropriate shape and size with the protective sheets thereon, edge seaming the protected coated article with the protective sheets thereon, and/or washing the protected coated article with the protective sheets thereon, so that following the cutting, edge seaming, and/or washing the protective sheets and protective coating remain at least partially adhered to the top surface of the low-E coating;

following said cutting, edge seaming, and/or washing, removing at least part of the temporary protective coating by peeling the protective sheets off of the top surface of the low-E coating to form an unprotected coated article, and also by removing at least part of the protective coating when peeling off the protective sheets;

after peeling the protective sheets off of the top surface of the low-E coating, thermally tempering the coated article including the glass substrate and low-E coating; and after said tempering, coupling the tempered coated article including the glass substrate and low-E coating to another glass substrate to form an IG window unit.

2. The method of claim 1, wherein the protective sheets comprise polyethylene.

3. The method of claim 1, wherein the at least one protective coating deposited initially in liquid form comprises a solvent-based and/or UV-curable liquid coating.

4. The method of claim 1, wherein the at least one protective coating deposited initially in liquid form is applied by spraying, extruding, or roll coating.

5. The method of claim 1, wherein the at least two flexible protective sheets comprise a first protective sheet and a second protective sheet to be adhered to the top surface of the low-E coating so that the first and second protective sheets overlap each other at least at edges portions thereof.

6. The method of claim 5, wherein the first and second protective sheets overlap by at least about 1 inch.

7. The method of claim 5, wherein the at least one liquid coating is applied to the top surface of the low-E coating proximate where the first and second protective sheets overlap or will overlap.

8. The method of claim 5, wherein the at least one protective coating deposited initially in liquid form is applied to the top surface of the first protective sheet proximate to where the first and second protective sheets overlap or will overlap.

9. The method of claim 1, wherein the at least two flexible protective sheets comprise a first protective sheet and a second protective sheet adhered to the top surface of the low-E in a slightly spaced-apart manner such that a gap is formed between the first and second protective layers.

10. The method of claim 9, wherein the first and second protective sheets are spaced apart by about 5-10 mm.

11. The method of claim 9, wherein a first liquid coating is applied directly to the top surface of the low-E coating proximate to where the gap between the first and second protective layers is formed or will be formed.

12. The method of claim 11, wherein a second liquid coating is applied to a top surface of the first and second protective layers proximate to where the gap between the first and second protective layers is formed or will be formed.

13. The method of claim 12, wherein a third protective layer is adhered to the first and second protective layers such that the third protective layer is adhered over at least the second liquid coating.

14. The method of claim 12, wherein a third liquid coating is adhered to the first and second protective layers such that the third liquid coating is adhered over the second liquid coating.

15. A method of making a window unit, the method comprising:

sputtering a multi-layered low-E and/or solar control coating onto a glass substrate, wherein the coating comprises at least one infrared (IR) reflecting layer sandwiched between at least first and second dielectric layers;

adhering at least two protective sheets in non-liquid form to a top surface of the coating to form a protected coated article;

applying at least one protective coating initially in liquid form directly on the top surface of the coating and over at least one of the flexible protective sheets to reduce one or more gaps formed between the coating and the flexible protective sheet(s) and/or between the flexible protective sheets;

the protective coating curing;

following curing of the protective coating and applying the protective sheets, cutting the protected coated article into at least one shape and size with the protective sheets and protective coating thereon, and thereafter washing the protected coated article with the protective sheets and protective coating thereon, so that following the cutting and washing at least the protective sheets at least partially remain on the glass substrate;

following said cutting and washing, peeling the protective sheets off of the top surface of the coating to form a substantially unprotected coated article;

after peeling the protective sheets off of the top surface of the coating, inserting the unprotected coated article into a furnace and heat treating the unprotected coated article including the glass substrate and coating in the furnace; and after said tempering, using the tempered coated article in making a window unit.

16. The method of claim 15, wherein the protective sheets comprises polyethylene.

17. The method of claim 15, wherein the protective coating as initially applied comprises a solvent-based and/or UV-curable liquid coating.

18. A method of making a window, the method comprising:

forming a coated article by forming a multi-layered low-E and/or solar control coating on a glass substrate;

providing at least two flexible protective sheets in non-liquid form to the glass substrate over at least part of the low-E and/or solar control coating;

applying at least one UV-curable protective coating in liquid form, before and/or after the flexible protective sheets are provided, so as to reduce one or more gaps formed between the low-E and/or solar control coating and the flexible protective sheet(s) and/or between the flexible protective sheets;

cutting, edge seaming, and/or washing the coated article, optionally with the protective coating and protective sheets thereon, and peeling the protective sheets and at least part of the protective coating off of the top surface of the low-E and/or solar control coating before or after the cutting, edge seaming and/or washing.

19. The method of claim 18, further comprising: after peeling the protective sheets off the top surface of the low-E coating, thermally tempering the coated article including the glass substrate and low-E coating; and after said tempering, using the coated article in a window unit.

* * * * *